UNITED STATES PATENT OFFICE.

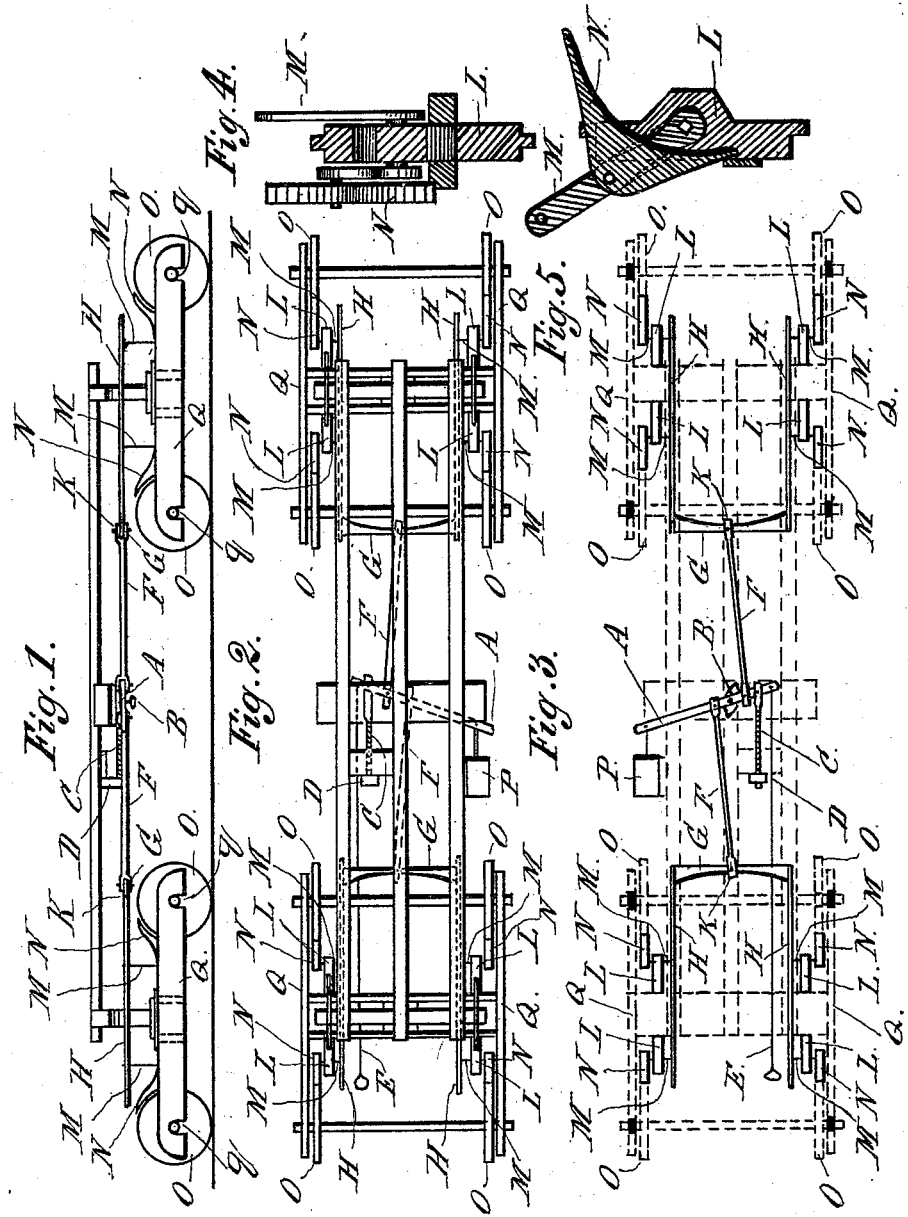

PHILLIP MAECHLING AND CHARLES FARLEY PORTER, OF NEW ORLEANS, LOUISIANA.

CAR-BRAKE.

SPECIFICATION forming part of Letters Patent No. 498,356, dated May 30, 1893.

Application filed December 24, 1892. Serial No. 456,295. (No model.)

*To all whom it may concern:*

Be it known that we, PHILLIP MAECHLING and CHARLES FARLEY PORTER, citizens of the United States, residing at New Orleans, in the parish of Orleans and State of Louisiana, have invented certain new and useful Improvements in Beamless Railway-Car Brakes; and we do declare the following to be a full, clear, and exact description of the invention, such as will enable others skilled in the art to which it appertains to make and use the same.

Our invention relates to an improvement in a car brake, and its novelty will be fully understood from the following description and claims, when taken in connection with the annexed drawings.

The objects of our invention are to provide a brake without a beam, thereby avoiding danger to the brakeman; also to provide a brake having shoes which rest upon the top of each car wheel, thus enabling greater pressure to be obtained. We attain these objects by the mechanism illustrated in the accompanying drawings, in which—

Figure 1 is a side view. Fig. 2 is a top view. Fig. 3 is a bottom view. Fig. 4 is a front view of brake shoe, arms and lever. Fig. 5 is a side view of shoe detached.

Similar letters refer to similar parts throughout the several views.

In the drawings A refers to a lever pivoted under the car at a point shown by B. Said lever A is also connected to a rod C, upon which rod there is a heavy spiral spring,—the end of said rod C being held in position by means of hanger D.

Connected to end of lever A is a metal rod E running lengthwise of the car, and by which a free movement of the lever A can be obtained.

F are arms pivoted to lever A, upon each side of the pivot B, and also pivoted to cross-pieces G of arms H at a point shown by K,—said arms H being connected to blocks L by means of levers M, and upon which levers brake shoes N are also attached as shown in Fig. 5.

O designates wheels of car truck; P, the hot air reservoir of air brake.

Q are side pieces connecting wheels, and have open bearings $q$, for the wheel axles so that when the car is raised the axle can be released from truck and a new pair of wheels replaced in a summary manner. Where desired the side pieces Q may be of a trestle frame form, thus diminishing the weight of the pieces Q.

In practice the brake operates differently from those in use from the fact that the brake shoes bear upon the top of each wheel, and when pressure is applied to the lever A, the brake shoes are thrown at once against the top of each wheel, and the momentum of the car allows a pressure to be brought against the wheels, thus giving a very heavy pressure upon the brake, and stopping the car in much less time than can be done with the brake now in use.

Our brake can be operated by hot air, or where desired the rod E may be used or the lever A may be operated from the side of the car.

Having described our invention and the manner in which the same is or may be carried into operation, we would say in conclusion that we do not limit ourselves to the details shown in illustration as the same may be varied to some extent, but

What we claim, and desire to secure by Letters Patent, is—

1. The combination in a beamless car brake, of the lever A pivoted to the bottom of the car, the arms F pivoted to the lever upon either side of its pivot point, the arms H, having cross pieces to which the arms F are pivoted, the blocks L, and the brake shoes connected to the said arms and lever, for the purpose set forth.

2. The combination in a beamless car brake, of the lever A, pivoted to the bottom of the car, the arms F pivoted to the lever upon either side of its pivot point, the cross pieces to which the arms are pivoted the arms H connected by the said cross pieces, the rod E, extending lengthwise the car, and the brake shoes connected to said arms and lever, for the purpose set forth.

In testimony whereof we affix our signatures in presence of two witnesses.

PHILLIP MAECHLING.
CHARLES FARLEY PORTER.

Witnesses:
JOHN MAECHLING,
RICARDO DEE.